Aug. 1, 1933.    H. S. HEICHERT    1,920,641
PROCESS AND APPARATUS FOR SEPARATING GLASS SHEETS
Filed July 13, 1932    3 Sheets-Sheet 1
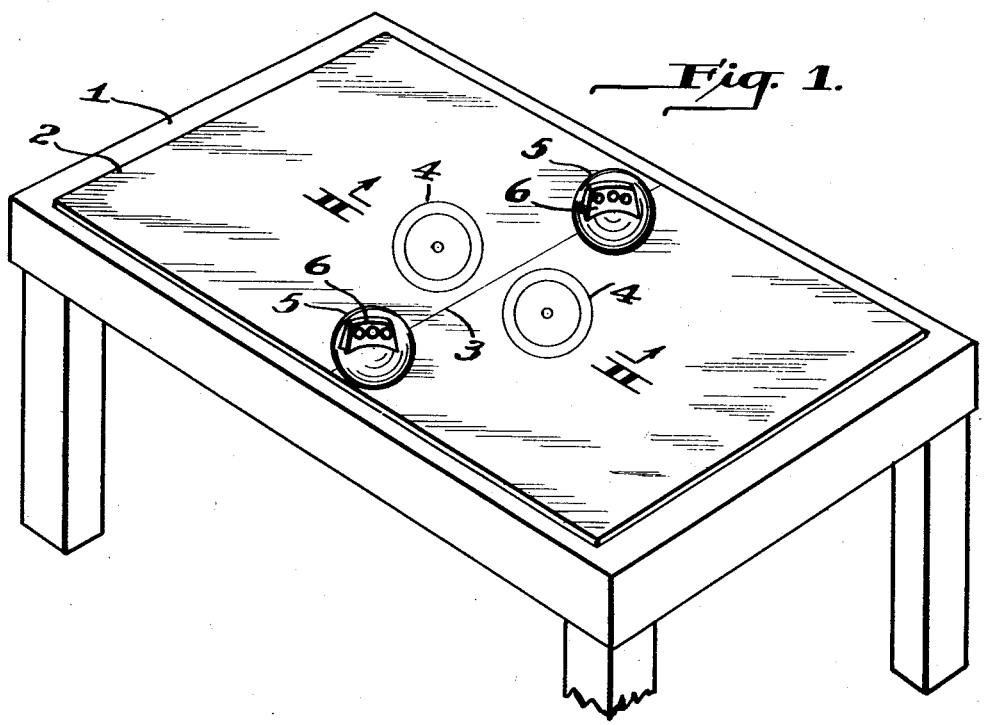
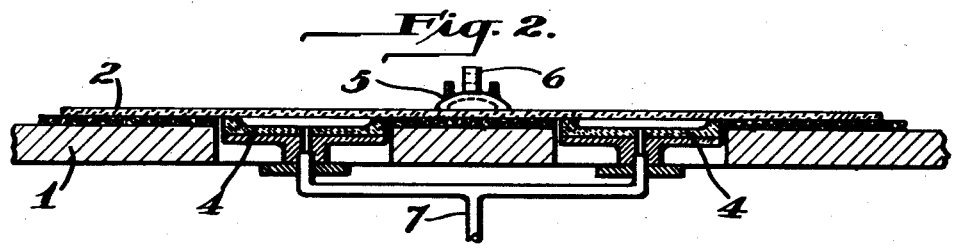
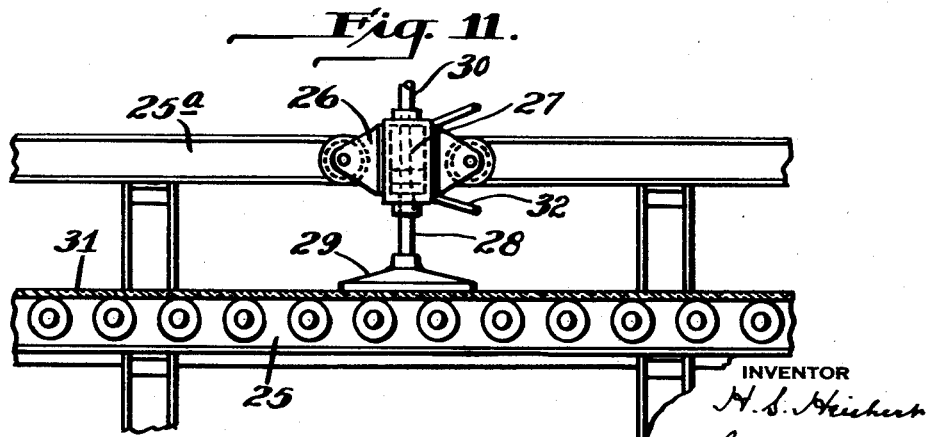

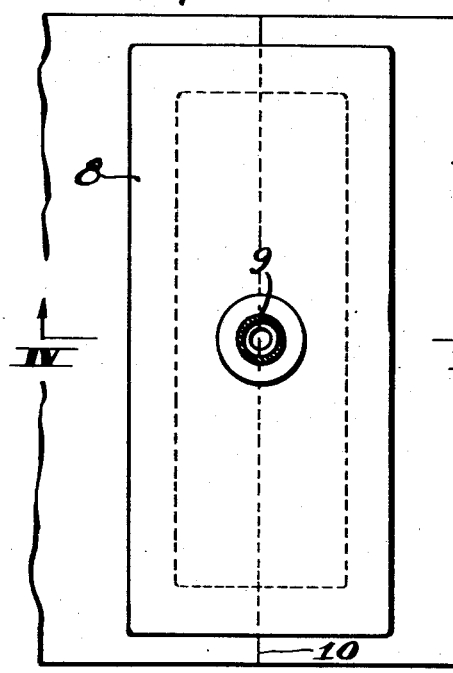
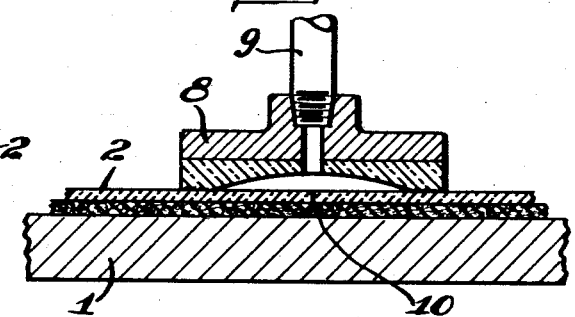
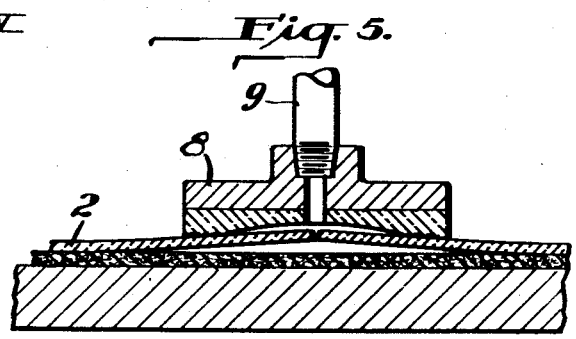
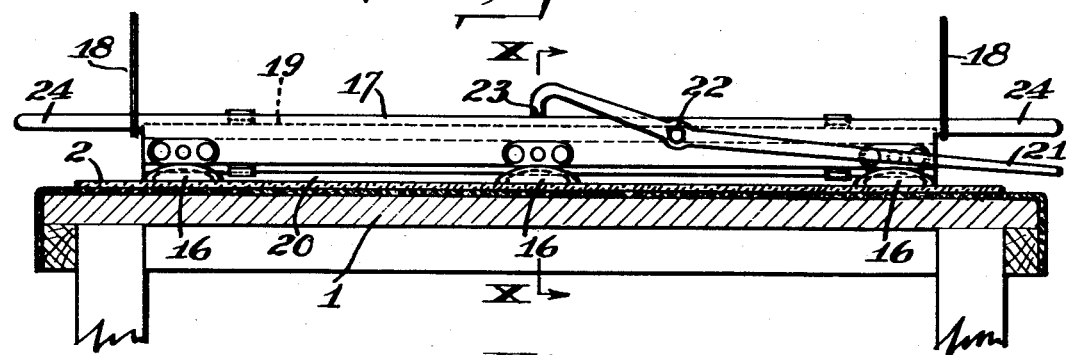
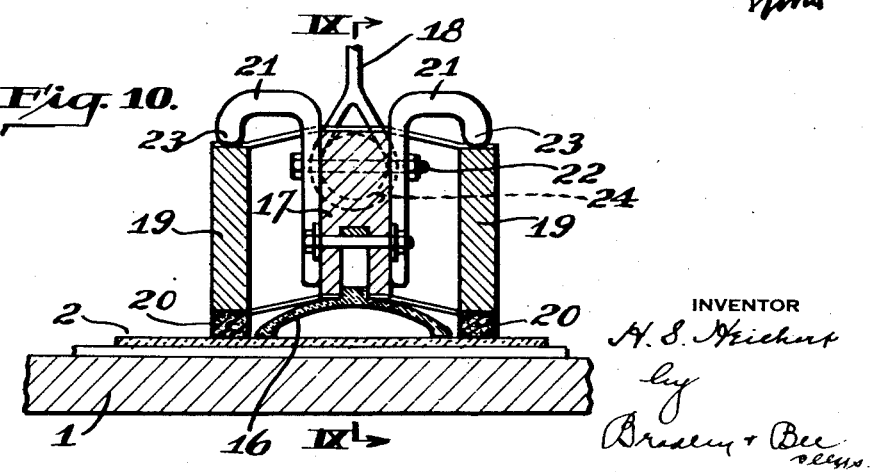

Aug. 1, 1933.   H. S. HEICHERT   1,920,641
PROCESS AND APPARATUS FOR SEPARATING GLASS SHEETS
Filed July 13, 1932   3 Sheets-Sheet 3
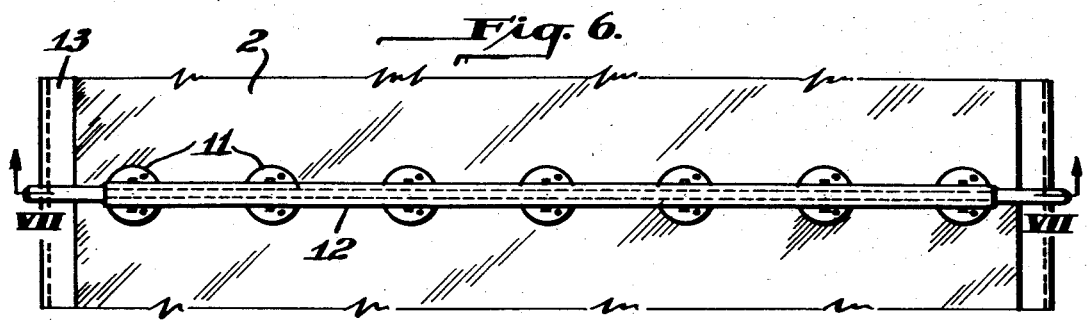
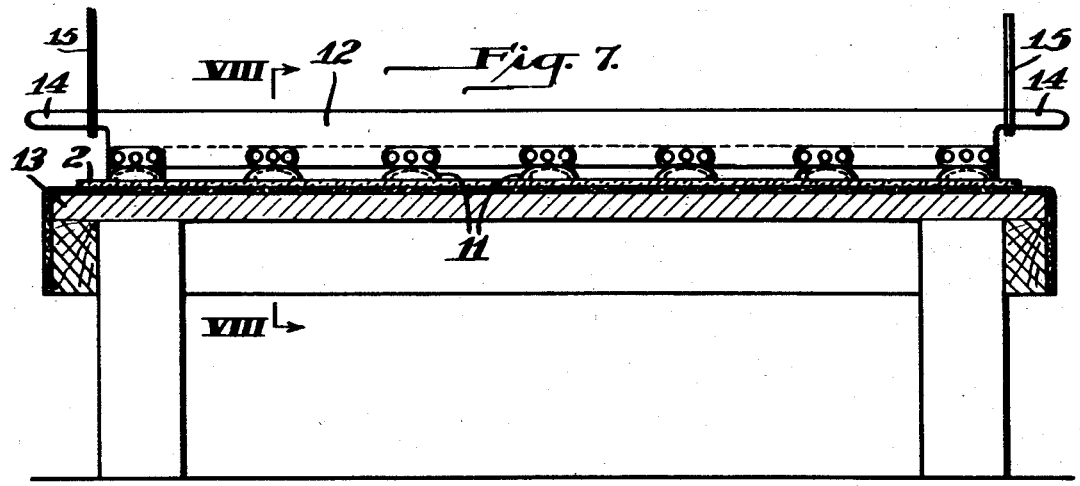
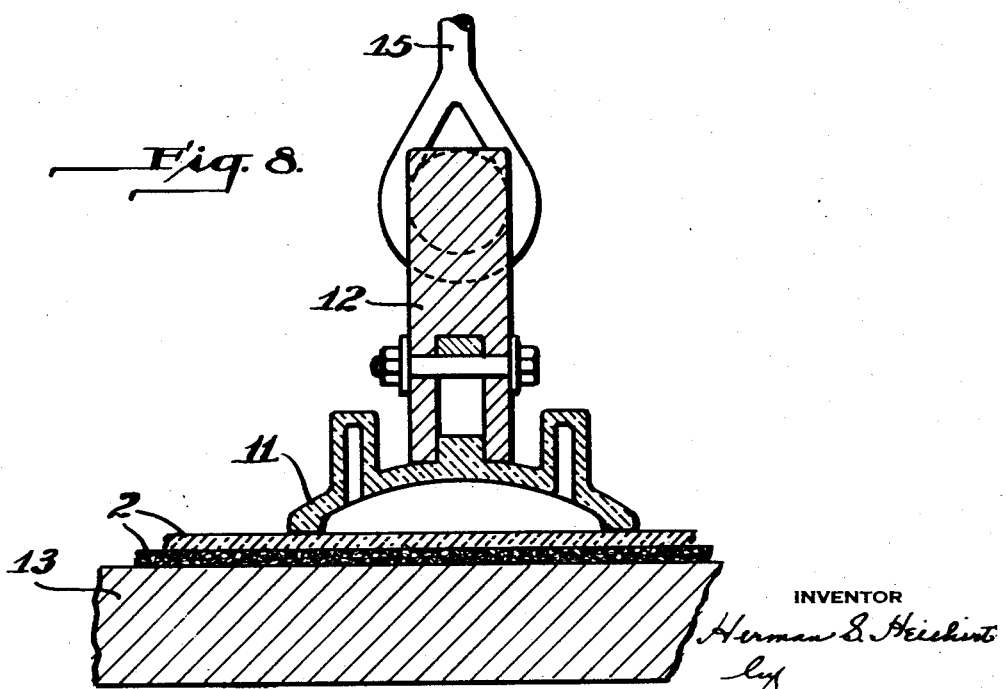
INVENTOR
Herman S. Heichert
by
Bradley & Bee
attys Patented Aug. 1, 1933

1,920,641

UNITED STATES PATENT OFFICE 1,920,641

PROCESS AND APPARATUS FOR SEPARATING GLASS SHEETS

Herman S. Heichert, Pittsburgh, Pa., assignor to Pittsburgh Plate Glass Company, a Corporation of Pennsylvania Application July 13, 1932. Serial No. 622,243

13 Claims. (Cl. 49—48)

The invention relates to a process and apparatus for snapping off glass sheets along the line of scoring, such scoring being accomplished in the usual way by means of a diamond or wheel. It has for its objects the provision of improved procedure and means for applying the force necessary to start the fracture. Briefly stated, this is accomplished by means of a vacuum cup or cups applied to the upper surface of the glass either directly over the line of scoring or closely adjacent thereto. The apparatus preferably employed is shown in the accompanying drawings, wherein:

Figure 1 is a perspective view of a cutting table to which the invention is applied. Fig. 2 is a section on the line II—II of Fig. 1. Figs. 3, 4 and 5 are detail views showing a modified vacuum cup construction, Fig. 4 being a section on the line IV—IV of Fig. 3 before the cup is exhausted and Fig. 5 being a similar section after air has been exhausted from the cup. Figs. 6, 7 and 8 show another modification, Fig. 6 being a plan view, Fig. 7 being a section on the line VII—VII of Fig. 6, and Fig. 8 being a section on the line VIII—VIII of Fig. 7. Figs. 9 and 10 show another modification, Fig. 9 being a section on the line IX—IX of Fig. 10 and Fig. 10 being a section on the line X—X of Fig. 9. And Fig. 11 is a section through still another modification.

Referring to the construction shown in Figs. 1 and 2, 1 is a cutting table; 2 is a sheet of glass on the table scored along the line 3; 4, 4 are a pair of vacuum cups supported by the frame of the table and adapted to engage the lower side of the sheet as indicated in Fig. 2; and 5, 5 are a pair of vacuum cups which are applied to the upper surface of the glass over the line of scoring, such cups having handles 6 with finger openings which may be engaged by the operator. In using the apparatus, air is exhausted from the vacuum cups 4 by means of the piping 7 connected to a suitable exhaust pipe, after which the operators apply the vacuum cups 5, 5 and apply a lifting force which causes the sheet to crack along the line 3. If the sheet is large and heavy, there is no requirement for the use of the holding down cups 4, 4. It is also feasible to practice the invention with only a single upper cup 5. In the case of thin glass, the application of a strong vacuum cup will in some cases be sufficient to fracture the glass.

Figs. 3, 4 and 5 illustrate an elongated vacuum cup 8 provided with an exhaust pipe 9. This cup is applied to the sheet above the line of scoring 10, as indicated in Fig. 4. When air is exhausted from the cup, the glass is forced upward, as indicated in Fig. 5, causing the glass to fracture along the line of scoring.

Figs. 6, 7 and 8 illustrate another application of the invention in which a plurality of vacuum cups 11, 11, 11, etc. are carried by a bar 12 extending transversely of the table 13. This bar is provided with handles 14 and is supported by means of cables 15 passing over pulleys (not shown) and connected to counterweights. In using the apparatus, the bar is placed over the line of cut and the operators press the bar down, causing an engagement of the cups with the upper surface of the sheet. Lifting force is then applied to the handles causing the sheet to crack along the line of scoring.

Figs. 9 and 10 show a further modification in which a plurality of vacuum cups 16 are carried by a bar 17 also supported from above by cables 18. On each side of the bar 17 is a holding down bar 19 provided with a felt strip 20 along its lower edge and resting on the surface of the glass. The bar 17 carries a pair of levers 21 pivoted at 22 and having toes 23 adapted to engage the tops of the bars 19. After the apparatus is positioned, as indicated in Figs. 9 and 10, the bar 17 is pressed down causing the engagement of the vacuum cups 16 with the glass. The operator then grasps the handles of the levers 21 and by an upward movement with respect to the handle 24 causes a lifting force to be exerted upon the bar 17 and a pressing down force to be exerted upon the bars 19. This causes a fracture of the glass along the line of scoring, as heretofore described.

Fig. 11 illustrates another modification in which the apparatus is located above the roller bed 25 at the outlet end of a leer. Mounted above the table is a track 25$^a$ upon which is mounted a carriage 26. This carriage is provided with an air lift 27 having a plunger 28. On the lower end of the plunger is mounted a vacuum cup 29 connected with a suitable exhausting device by means of the pipe 30. The glass sheet 31 is scored along the desired line of separation and the vacuum cup is placed over the line of scoring and caused to engage the glass, after which air supplied through the pipe 32 causes the upward movement of the plunger of the air lift.

What I claim is:

1. A method of snapping a glass sheet scored on its upper face which consists in applying a lifting force to the upper surface of the sheet adjacent the line of scoring.

2. A method of snapping a glass sheet scored on its upper face which consists in applying a vacuum lifting device to the upper surface of the sheet adjacent the line of scoring.

3. A method of snapping a glass sheet scored on its upper face which consists in exhausting the air from an area lying over the line of scoring so as to apply a strain to the sheet at such point and start a fracture.

4. A method of snapping a glass sheet scored on its upper face which consists in applying a pull to the scored surface adjacent the line of scoring and holding the sheet on each side of the line of scoring against movement in the direction of said pull.

5. A method of snapping a glass sheet scored on its upper face which consists in applying a vacuum cup over the line of scoring and exhausting the air therefrom.

6. Apparatus for snapping a glass sheet scored on its upper surface, comprising means for holding the sheet on each side of the line of scoring from upward movement and a vacuum lifting device for engaging the upper face of the sheet between said means for applying a lifting force to the sheet.

7. Apparatus for snapping a glass sheet scored on its upper surface, comprising means for holding the sheet on each side of the line of scoring from upward movement, a vacuum cup for engaging the upper face of the sheet between said means, and means for applying a lifting force to the cup.

8. Apparatus for snapping a glass sheet scored on its upper surface, comprising a table for supporting the sheet, a pair of vacuum cups held against upward movement arranged to engage the lower surface of the sheet on opposite sides of the line of scoring, and a vacuum cup for engaging the upper surface of the sheet between said cups provided with lifting means.

9. Apparatus for snapping a glass sheet scored on its upper surface, comprising a table for supporting the sheet, a lifting bar extending transversely above the table, a vacuum cup on the bar for engaging the upper surface of the sheet and movable means carried by the bar for engaging the sheet on opposite sides of the cup and for applying a downward pressure thereon.

10. Apparatus for snapping a glass sheet scored on its upper surface, comprising a table for supporting the sheet, a lifting bar extending transversely above the table, means for supporting the bar for lateral adjustment over the table and for vertical movement, and a vacuum cup carried by the bar and adapted to engage the upper surface of the glass sheet.

11. Apparatus for snapping a glass sheet scored on its upper surface, comprising a table for supporting the sheet, a vacuum cup mounted above the table for lateral adjustment thereover, and means for applying a lifting force to the cup.

12. Apparatus for snapping a glass sheet scored on its upper surface, comprising a table for supporting the sheet, a track extending over the table, a carriage on the track, a vacuum cup supported by the carriage, and means on the carriage for applying a lifting force to the cup.

13. Apparatus for snapping a glass sheet scored on its upper surface, comprising a table for supporting the sheet, a track extending over the table, a carriage on the track, a vacuum cup supported by the carriage, and power means on the carriage for applying a lifting force to the cup.

HERMAN S. HEICHERT.